United States Patent Office 3,039,990
Patented June 19, 1962

3,039,990
INTERPOLYAMIDES AND PROCESS FOR
PREPARING SAME
William A. H. Huffman, Decatur, Ala., assignor, by mesne assignments, to Monsanto Chemical Company, a corporation of Delaware
No Drawing. Filed Oct. 19, 1959, Ser. No. 847,059
17 Claims. (Cl. 260—42)

This invention relates to synthetic polymeric materials, and more particularly to novel synthetic linear polycarbonamides having an affinity for basic dyestuffs.

The polymeric substances with which this invention is concerned are synthetic, high molecular weight, fiber-forming polycarbonamides of the general type characterized by the presence of recurring carbonamide groups as an integral part of the polymer chain, and wherein such groups are separated by at least two carbon atoms. They are further characterized by high melting point, pronounced crystallinity, and insolubility in most solvents except mineral acids, formic acid, and the phenols. Upon hydrolysis with strong mineral acids, the polymers revert to the reactants from which they were formed.

The simple polyamides of this type are usually made by the self-polymerization of a monoaminomonocarboxylic acid or by heating substantially equimolecular proportions of a diamine with a dibasic carboxylic acid until the product has polymerized to the fiber-forming stage, which stage is not generaly reached until the polyamide has an intrinsic viscosity of at least 0.4, the intrinsic viscosity being defined as $$\frac{\log_e N_r}{C}$$

in which $N_r$ is the relative viscosity of a dilute solution of the polymer in m-cresol in the same units at the same temperature, and C is the concentration in grams of polymer per 100 cc. of solution. The polymers thus obtained have high melting points and can be cold drawn to form strong, highly oriented fibers.

The amino acids, dibasic carboxylic acids, diamines and their derivatives which can be used as reactants to yield the simple fiber-forming polyamides are well known to the art. Thus, amino acids which can be self-polymerized to yield these polymers are represented by the general formula RNH—R'COOH in which R is a univalent organic radical or hydrogen and R' is a divalent hydrocarbon radical having a chain length of at least five carbon atoms. Illustrative examples are 6-aminocaproic acid, 9-aminononanoic acid, 11-aminoundecanoic acid and 17-aminoheptadecanoic acid.

Diamines which can be condensed with equimolecular proportions of an appropriate dibasic carboxylic acid to yield fiber-forming polyamides may be represented by the general formula $NH_2[CH_2]_nNH_2$ in which $n$ is an integer of 2 or greater and preferably from 2 to 8. Suitable examples are ethylenediamine, propylenediamine, tetramethylenediamine, pentamethylenediamine, hexamethylenediamine, octamethylenediamine and decamethylenediamine.

Suitable dibasic carboxylic acid reactants are represented by the general formula HOOCRCOOH in which R is a divalent hydrocarbon radical having a chain length of at least two carbon atoms. These materials are illustrated by sebacic acid, octadecanedioic acid, adipic acid, suberic acid, azelaic acid, undecanedoic acid, glutaric acid, pimelic acid, brassylic acid and tetradecanedioic acid.

In place of the above-noted amino acids, dibasic carboxylic acids and diamines, the amide-forming derivatives thereof can be employed to form fiber-forming polymers. Amide-forming derivatives of the amino acids include the ester, anhydride, amide, lactam, acid halide, N-formyl derivative, carbamate, and, in the presence of water, the nitrile. Amide-forming derivatives of the diamines include the carbamate, and N-formyl derivative. Amide-forming derivatives of the dibasic carboxylic acids comprise the mono- and di-ester, the anhydride, the mono- and di-amide and the acid halide.

Although the textile fibers obtained from the fiber-forming polyamides as described hereinabove are of great value, they are deficient in dyeing properties in that they have little receptivity for basic dyestuffs. This is a disadvantage in that bright shades of color are often demanded for textile fabrics which can be obtained only with basic type dyes. In general, basic dyes are characterized by the brilliancy of the colors they produce on textile fibers, and their great tinctorial power. Thus, it is often possible to obtain full shades of color with as little as one percent of basic dyestuff.

A number of methods have been proposed to increase the affinity of polyamide fibers for basic dyestuffs, but they have not proven satisfactory in practice. One such proposal has been to increase the acidification of the polymer by way of viscosity stabilizers having acidic groups. This particular approach has not been successful because of an adverse affect upon properties which make these polymers of such value in the preparation of textile fibers, e.g., excessive lowering of melting point and deterioration of spinning performance.

It is, therefore, a primary object of this invention to provide a new class of polyamides and a process for preparing same.

A further object of this invention is the preparation of interpolyamides having a high receptivity for basic dyestuffs as well as good fiber-forming properties.

Other objects will become apparent from the description which follows.

These objects are attained by interpolymerizing a first polyamide-forming composition selected from the group consisting of (A) a monoaminomonocarboxylic acid and amide-forming derivatives thereof, and (B) substantially equimolecular proportions of a dibasic carboxylic acid and a diamine or their amide-forming derivatives; and a second polyamide-forming composition consisting of from about 0.2 to about 5.0 molar percent and preferably from about 0.3 to 2.5 molar percent based on said first polyamide-forming composition of a sulfonated aromatic compound possessing two amide-forming functional groups, and a molecular equivalent of said difunctional aromatic compound of either a diamine or dibasic carboxylic acid. That is, complementary amide-forming groups are provided by employing a substantially equivalent amount of diamine when the functional groups of the sulfonated aromatic compound are complementary thereto, or a like amount of dibasic carboxylic acid when the functional radicals of the sulfonated aromatic compound contain amino groups.

As indicated, the aromatic agents found useful in the practice of this invention are characterized by the presence of two amide-forming radicals and a sulfonate group attached to the ring. Representative agents of this type include: dicarboxyaryl compounds of the general formula:

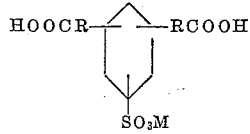

where R is an alkylene radical containing from 0 to 5 carbon atoms and M is an alkali metal, such as sodium and potassium-2,5- and -3,5-dicarboxybenzene sulfonate; sodium and potassium-2,5- and -3,5-dicarboxydimethylbenzene sulfonate; sodium and potassium-2,5- and -3,5-dicarboxydipropylbenzene sulfonate and -2,5- and -3,5-dicarboxydibutylbenzene sulfonate. Representative agents also include dicarboalkoxyaryl compounds of the general formula:

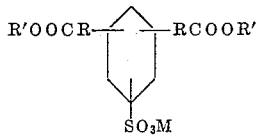

where R is an alkylene radical containing from 0 to 5 carbon atoms and R' is an alkyl radical containing from 1 to 5 carbon atoms, such as sodium and potassium-2,5- and -3,5-dicarbomethoxybenzene sulfonate; sodium and potassium-2,5- and -3,5-dicarbobutoxydimethylbenzene sulfonate; and sodium and potassium-2,5- and -3,5-dicarbomethoxydibutylbenzene sulfonate. Also representative of the aromatic compounds which can be suitably employed are diaminoaryl compounds of the general formula:

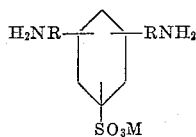

where R is an alkylene radical of from 1 to 5 carbon atoms and M is an alkali metal, such as sodium and potassium-2,5- and -3,5-diaminodimethylbeznene sulfonate; sodium and potassium-2,5- and -3,5-diaminodiethylbenzene sulfonate and sodium and potassium-2,5- and -3,5-diaminodiamylbenzene sulfonate.

The diamines and dibasic acids which can be employed in conjunction with the above-described amide-forming, sulfonated aromatic agents to provide complementary amide-forming groups therefor are any of the diamines and dibasic carboxylic acids used in the preparation of simple polyamides, examples of which have been previously noted herein. That is, appropriate diamines may be represented by the general formula $NH_2[CH_2]_nNH_2$ where $n$ is an integer of 2 or greater, preferably from 2 to 8; and dibasic carboxylic acids by the general formula HOOCRCOOH in which R is a divalent hydrocarbon radical having a chain length of at least 2 carbon atoms and preferably from 2 to 8. It is, of course, understood that the amide-forming derivatives of these compounds can also be suitably employed.

The interpolyamides of this invention are prepared by procedures well-known in the art and commonly employed in the manufacture of simple polyamides. That is, the reactants are heated at a temperature of from 180° C. to 300° C. and preferably from 200° C. to 295° C. until the product has a sufficiently high molecular weight to exhibit fiber-forming properties. This condition is reached when the polyamide has an intrinsic viscosity of at least 0.4 in accordance with the definition of intrinsic viscosity as given hereinabove. The reaction can be conducted at super-atmospheric, atmospheric, or subatmospheric pressure. Often it is desirable, especially in the last stage of the reaction, to employ conditions, e.g., reduced pressure, which will aid in the removal of the reaction by-products. Preferably, the reaction is carried out in the absence of oxygen, e.g., in an atmosphere of nitrogen.

In order to illustrate the invention and the advantages thereof with greater particularity, the following specific examples are given, it being understood that they are intended to be only illustrative and not limitative. Parts are given by weight unless otherwise indicated.

Example I

This example illustrates the preparation of a simple fiber-forming polyamide and is to be used as a standard of comparison with the interpolyamides of the present invention.

A mixture of 223 grams of hexamethylenediammonium adipate, 2.48 grams of adipic acid, as a viscosity stabilizer, and 90 ml. of water were charged to a stainless steel autoclave. The charge and system were purged of air by a nitrogen purge. The pressure and temperature were then slowly raised until values of 250 p.s.i.g. and 295° C. respectively were reached after which water was removed as condensate until the polymer melt temperature was about 240° C. At this point, the autoclave pressure was reduced at the rate of 5 p.s.i.g. a minute until atmospheric pressure was reached. The polymerization was completed by heating at atmospheric pressure for 30 minutes. The final reaction temperature was about 280° C.

The polymer was melt spun from the autoclave as undrawn single filament fibers. The melt spun fibers were then machine drawn to a draw ratio of 4.6.

Example II

A mixture of 223 grams of hexamethylenediammonium adipate, 2.567 grams of potassium-3,5-dicarboxybenzene sulfonate, 0.986 grams of hexamethylenediamine dissolved in 30 ml. of water, 3 ml. of 1 N acetic acid, as a viscosity stabilizer, and 60 ml. of water were charged to a stainless steel autoclave. The charge and the system were purged of air by means of free nitrogen. The charge was then heated at a temperature of approximately 295° C. while a pressure of 250 p.s.i.g. was maintained, and water was removed as condensate until the polymer melt temperature was about 240° C. At this point, the autoclave pressure was reduced at the rate of 5 p.s.i.g. a minute until atmospheric pressure was reached. The polymerization was completed by heating at atmospheric pressure for 30 minutes. The final reaction temperature was about 280° C.

The polymer was melt spun from the autoclave as undrawn single filament fibers, and showed excellent melt spinning characteristics. The melt spun fibers were then machine drawn to a draw ratio of 4.5.

Example III

A mixture of 223 grams of hexamethylenediammonium adipate, 3.85 grams of potassium-3,5-dicarboxybenzene sulfonate, 1.48 grams of hexamethylene dissolved in 30 ml. of water, 4 ml. of 1 N acetic acid, as a viscosity stabilizer, and 60 ml. of water were charged to a stainless steel autoclave. The charge and the system were purged of air by means of free nitrogen. The charge was then heated at a temperature of approximately 295° C. with the pressure at 250 p.s.i.g., and water was removed as condensate until the polymer melt temperature was about 240° C. At this point, the autoclave pressure was reduced at the rate of 5 p.s.i.g. a minute until atmospheric pressure was reached. The polymerization was completed by heating at atmospheric pressure for 30 minutes. The final reaction temperature was about 280° C.

The polymer was melt spun from the autoclave as undrawn single filament fibers, and showed excellent melt spinning characteristics. The melt spun fibers were then machine drawn to a draw ratio of 4.5.

In order to demonstrate the practical usefulness of the interpolyamides of the present invention, tests were conducted comparing the affinity for basic dyes of the above examples. The samples were dyed with comparable concentrations of the commercial basic dye Sevron Blue B, CI 4285. The dyeing was conducted in a bath maintained at a pH of 5.3–5.4 and at a temperature of 210–212° F. The dyeing period was two hours in length. The test results are given in the following table.

| Example | Initial Basic Dye Concentration: Percent (O.W.F.) | Percent Basic Dye Absorbed (O.W.F.) |
|---|---|---|
| I (Control) | 10 | 0.8 |
| II | 10 | 3.0 |
| III | 10 | 9.4 |

In order to further illustrate the principles and practice of the present invention, the following examples are given wherein a derivative of 6-aminocaproic acid, i.e., caprolactam was used in place of a diamine-dibasic acid salt to prepare the polymers.

*Example IV*

A simple fiber-forming polyamide was prepared for use as a standard of comparison with an interpolyamide prepared in accordance with the present invention.

A charge consisting of 60 grams of caprolactam and 26 ml. of water was placed in a small stainless steel autoclave. After air was removed from the system by means of a nitrogen purge, the pressure and temperature were raised over a period of 50 minutes to values of 250 p.s.i.g. and 250° C., respectively. At this point, the autoclave pressure was reduced at the rate of 25 p.s.i.g. every 9 minutes until atmospheric was reached, during which time water was removed from the polymer as condensate. The pressure was then further reduced over a period of approximately 35 minutes to a value of 100 mm. of mercury where it was held for approximately 18 minutes. The polymerization was completed by raising the pressure to atmospheric level.

*Example V*

A mixture of 60 grams of caprolactam, 4.66 grams of potassium-3,5-dicarboxybenzene sulfonate, 2.52 grams of a 75 percent aqueous solution of hexamethylenediamine and 26 ml. of water were charged to a stainless steel autoclave. After the system was purged of air with nitrogen, the charge was heated from room temperature to 240° C. over a period of 45 minutes while a pressure of 250 pounds per square inch was maintained. At this point, the autoclave pressure was reduced at the rate of 25 pounds per square inch every 8 minutes until atmospheric pressure was reached, during which time water was removed from the polymer as condensate. A vacuum of 100 mm. of mercury was then drawn on the reaction mass for a period of 18 minutes, after which the pressure on the system was again raised gradually to atmospheric level to complete the polymerization.

The polymer was melt spun from the autoclave as undrawn single filament fibers, and showed excellent melt spinnability characteristics. The melt spun fibers were then machine drawn to a draw ratio of 4.5.

The table below shows the results obtained from a comparative testing of Examples IV and V for basic dye receptivity in accordance with the same procedure as applied in Examples I, II and III.

| Example | Initial Basic Dye Concentration: Percent (O.W.F.) | Percent Basic Dye Absorbed (O.W.F.) |
|---|---|---|
| IV (Control) | 16 | Negligible. |
| V | 16 | 15.8. |

It is apparent from the foregoing examples and the data given in connection therewith that the interpolyamides of this invention are markedly improved in their affinity for basic dyes when compared with heretofore known polyamides. Illustrative examples of basic dyes which can be used more advantageously with products obtained in the practice of this invention are Sevron Blue B, CI 4285; Tertrophene Yellow O, CI 49005; Sevron Yellow R, CI 48055; Victoria Green S, CI 42000; Brilliant Green B, CI 42040; Basolan Brilliant Red, CI 45170; and Sevron Brilliant Red, CI 48015.

The novel interpolymers of this invention are of primary interest in the preparation of yarns and fabrics. However, they can also be used in other applications to which synthetic linear polyamides have been put, e.g., bristles, films and the like. They are of particular value in uses where an enhanced receptivity for basic dyestuffs is desired.

The polyamides of this invention can be used in conjunction with other polyamides and/or in connection with delusterants and other modifying agents.

As many apparently widely different embodiments of this invention may be made without departing from the spirit and scope thereof, it is to be understood that I do not limit myself to the specific embodiments thereof except as defined in the appended claims.

I claim:
1. A fiber-forming synthetic linear polycarbonamide of the type having recurring amide groups as an integral part of the main polymer chain, and wherein said groups are separated by at least 2 carbon atoms, which comprises the interpolymerization product obtained from reactants comprising a first polyamide-forming composition selected from the group consisting of (A) a polymerizable monoaminomonocarboxylic acid, and (B) substantially equimolecular proportions of a dibasic carboxylic acid and a diamine; and a second polyamide-forming composition consisting of from about 0.2 to 5.0 molar percent based on said first polyamide-forming composition of a difunctional aromatic compound of the general formula:

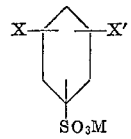

where M is an alkali metal, and X and X' are radicals having identical functional groups, said radicals being selected from the group consisting of COOH, RCOOH where R is an alkylene radical with from 1 to 5 carbon atoms, COOR where R is an alkyl radical containing from 1 to 5 carbon atoms, RCOOR' where R is an alkylene radical containing from 1 to 5 carbon atoms and R' is an alkyl radical containing 1 to 5 carbon atoms, and $RNH_2$ where R is an alkylene radical with from 1 to 5 carbon atoms, and an equivalent of said difunctional aromatic compound of a compound selected from the group consisting of a diamine when X and X' contain carbonyl groups and a dibasic carboxylic acid when X and X' contain amino groups.

2. The fiber-forming synthetic linear polycarbonamide as set forth in claim 1, wherein said first polyamide-forming composition consists of 6-aminocaproic acid.

3. The fiber-forming synthetic linear polycarbonamide as set forth in claim 1, wherein said first polyamide-forming composition consists of substantially equimolecular proportions of adipic acid and hexamethylenediamine.

4. The fiber-forming synthetic linear polycarbonamide as set forth in claim 1, wherein said difunctional aromatic compound is potassium-3,5-dicarboxybenzene sulfonate.

5. The fiber-forming synthetic linear polycarbonamide as set forth in lcaim 1, wherein said difunctional aromatic compound is sodium-3,5-dicarboxybenzene sulfonate.

6. The fiber-forming synthetic linear polycarbonamide as set forth in claim 1, wherein said difunctional aromatic compound is sodium-3,5-dicarboxybenzene sulfonate.

7. The fiber-forming synthetic linear polycarbonamide as set forth in claim 1, wherein said difunctional aromatic compound is potassium-2,5-diaminodimethylbenzene sulfonate.

8. The fiber-forming synthetic linear polycarbonamide as set forth in claim 1, wherein said difunctional aromatic compound is potassium-3,5-dicarbomethoxybenzene sulfonate.

9. A textile fiber comprising the polycarbonamide as defined in claim 1.

10. A process for making fiber-forming synthetic linear polycarbonamides with improved receptivity for basic dyestuffs which comprises interpolymerizing a first polyamide-forming composition selected from the group consisting of (A) a polymerizable monoaminomonocarboxylic acid, and (B) substantially equimolecular proportions of a dibasic carboxylic acid and a diamine, with a second polyamide-forming composition consisting of from about 0.2 to 5.0 molar percent based on said first polyamide-forming composition of a difunctional aromatic compound of the general formula:

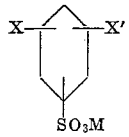

where M is an alkali metal, and X and X' are radicals having identical functional groups, said radicals being selected from the group consisting of COOH, RCOOH where R is an alkylene radical with from 1 to 5 carbon atoms, COOR where R is an alkyl radical containing from 1 to 5 carbon atoms, RCOOR' where R is an alkylene radical containing from 1 to 5 carbon atoms and R' is an alkyl radical containing 1 to 5 carbon atoms, and $RNH_2$ where R is an alkylene radical with from 1 to 5 carbon atoms, and an equivalent of said difunctional aromatic compound of a compound selected from the group consisting of a diamine when X and X' contain carbonyl groups and a dibasic carboxylic acid when X and X' contain amino groups.

11. The process set forth in claim 10 in which said first polyamide-forming composition consists of 6-aminocaproic acid.

12. The process set forth in claim 10 in which said first polyamide-forming composition consists of substantially equimolecular proportions of adipic acid and hexamethylenediamine.

13. The process as set forth in claim 10, wherein said difunctional aromatic compound is potassium-3,5-dicarboxybenzene sulfonate.

14. The process as set forth in claim 10, wherein said difunctional aromatic compound is potassium-2,5-dicarboxybenzene sulfonate.

15. The process as set forth in claim 10, wherein said difunctional aromatic compound is sodium-3,5-dicarboxybenzene sulfonate.

16. The process as set forth in claim 10, wherein said difunctional aromatic compound is potassium-2,5-diaminodimethylbenzene sulfonate.

17. The process as set forth in claim 10, wherein said difunctional aromatic compound is potassium-3,5-dicarbomethoxybenzene sulfonate.

References Cited in the file of this patent

UNITED STATES PATENTS

| | | |
|---|---|---|
| 1,935,264 | Felix et al. | Nov. 14, 1933 |
| 2,252,554 | Carothers | Aug. 12, 1941 |
| 2,252,555 | Carothers | Aug. 12, 1941 |
| 2,689,864 | Emerson et al. | Sept. 21, 1954 |

UNITED STATES PATENT OFFICE
CERTIFICATE OF CORRECTION

Patent No. 3,039,990                                June 19, 1962

William A. H. Huffman

It is hereby certified that error appears in the above numbered patent requiring correction and that the said Letters Patent should read as corrected below.

Column 5, line 28, for "_2.52 grams" read -- 2.52 grams --; column 6, line 61, for "lcaim" read -- claim --; line 62, for "sodium-3,5-" read -- potassium-2,5- --.

Signed and sealed this 23rd day of October 1962.

(SEAL)
Attest:

ERNEST W. SWIDER                                    DAVID L. LADD
Attesting Officer                                       Commissioner of Patents